Patented Sept. 30, 1941

2,257,284

UNITED STATES PATENT OFFICE 2,257,284

PREPARATION OF TARTARIC ACIDS

William E. Stokes, Brooklyn, and William E. Barch, Farmingdale, N. Y., assignors to Standard Brands Incorporated, New York, N. Y., a corporation of Delaware No Drawing. Application November 26, 1938, Serial No. 242,632

10 Claims. (Cl. 260—528)

The invention relates to a process for the production of tartaric acids. More particularly, it is concerned with the manufacture of dextro and meso tartaric acids by oxidizing a suitable carbohydrate material, and includes correlated improvements and discoveries whereby the preparation of these acids is enhanced.

The production of tartaric acids through the oxidation of a carbohydrate by means of nitric acid is attended by the disadvantage that if sufficient nitric acid is introduced to convert all of the carbohydrate then the tartaric acid which is formed in the first stages of the oxidation is attacked by the nitric acid and converted into oxalic acid with an attendant loss in yield.

It is an object of the present invention to overcome this disadvantage and to decrease at least materially the loss of tartaric acid due to oxidation.

It is a further object of the invention to provide a process for tartaric acid production through oxidation of a carbohydrate which results in a decidedly increased yield.

An additional object of the invention is to provide a process in accordance with which tartaric acids are produced by a partial or stage oxidation of a carbohydrate, and which may be readily, efficiently and economically carried out in commercial practice.

A more particular object of the invention is the provision of a manner whereby dextro and meso tartaric acids and oxalic acid may be precipitated from a reaction mixture.

A specific object of the invention is the provision of a precipitant which reacts with dextro and meso tartaric acids and oxalic aced to form insoluble salts that crystallize readily but which reacts with saccharic acid or like compounds or incompletely reacted carbohydrates to form salts which while being insoluble do not readily crystallize.

Other objects of the invention will in part be obvious and will in part appear hereinafter.

The invention accordingly comprises the several steps and the relation of one or more of such steps with respect to each of the others thereof, which will be exemplified in the method hereinafter disclosed, and the scope of the invention will be indicated in the claims.

In the practice of the invention, tartaric acids, especially dextro and meso tartaric acids, may be produced from a carbohydrate material through oxidation, e. g., by the addition of concentrated nitric acid to an aqueous solution of a carbohydrate, in a manner such that the oxidation is effected partially or in stages.

More particularly, a carbohydrate, e. g., dextrose, sucrose and the like, may be oxidized in aqueous solution by the addition thereto of concentrated nitric acid, and preferably while heated. The quantity of nitric acid added is insufficient to complete the oxidation and the reaction mixture preferably contains also a catalytic agent containing vanadium, especially sodium orthovanadate. Oxalic acid which is formed by the oxidation is permitted to separate with an attending cooling of the solution and it is then separated from liquid, or mother liquor in a suitable manner, as by filtration.

Oxidation of the carbohydrate results in a formation of dextro and meso tartaric acids as well as oxalic acid, and the dextro and meso acids are crystallized after separation of the oxalic acid and along with residual oxalic acid in the form of an insoluble salt, especially as a metal salt, and specifically as their zinc, lead, barium, calcium and strontium salts. This precipitation by crystallization may be brought about preferably by the addition of a zinc compound with satisfactory results attending the addition of zinc carbonate. Such addition, desirably, is carried out until about 60% to about 70%, and preferably about 65% of the acid present in the reaction mixture has been neutralized, and while in heated condition. There results a crystallized precipitate containing zinc dextro and meso tartrates and zinc oxalate. Following cooling, the zinc salts are separated from the mixture, as by filtration, and the zinc tartrates may be converted into the corresponding dextro and meso tartaric acids by reaction with oxalic acid. This conversion might be effected also through the addition of a compound, as an acid, whose reaction product with zinc is less soluble than are the zinc tartrates.

From the filtrate, resulting from separation of the zinc salts, there may be obtained a further quantity of tartaric acids by the addition thereto of concentrated nitric acid. Oxidation of incompletely oxidized carbohydrate material occurs and this reaction mixture may then be processed in the manner above outlined, that is, with separation of oxalic acid, and crystallization, separation and conversion into dextro and meso tartaric acids.

Neutralization of acid present may be brought about not only by addition of zinc carbonate but also through the addition of an alkali, as sodium and potassium, hydroxide, carbonate and bicarbonate, to an extent of about 60% to 70% of the acid and this neutralization followed by the introduction of a suitable zinc salt whereby the tartaric acids and oxalic acid are converted into insoluble zinc compounds which readily crystallize. The amount of alkali to accomplish a 65% neutralization may be determined by taking an aliquot, determining the amount of acid therein, and therefrom calculating the quantity which must be added in order to react with 65% of the acid. Furthermore, the zinc salt may be added to the filtrate in the cold and the resulting mass brought nearly to boiling, and then cooled. There is thus obtained a granular precipitate which is easily filtered and washed.

The precipitate formed by the addition of a zinc compound contains zinc dextro and meso tartrates together with a small amount of zinc oxalate and following separation by filtration the tartrates may be decomposed by the addition of oxalic acid or another acid, the zinc salts of which are less soluble than are the zinc tartrates. In the case of oxalic acid this leads to a conversion of the zinc dextro and meso tartrates into zinc oxalate which precipitates while the corresponding dextro and meso tartaric acids remain in solution. The zinc oxalate may be removed in any suitable manner and the mixture of dextro and meso tartaric acids further purified by methods known to those skilled in the art.

As an illustrative embodiment of a manner in which the invention may be practiced the following examples are presented. The parts are by weight:

Example I

One hundred parts of dextrose or corn sugar are subjected to oxidation in aqueous solution by admixture therewith of 150 parts of strong nitric acid and 31 parts of water. The reaction mixture thus formed is permitted to undergo conversion and if desired the solution may be heated in order to facilitate and complete the reaction. This solution, which contains dextro and meso tartaric acids, and oxalic acid, after cooling, contains a considerable amount of crystallized oxalic acid. In fact, the major portion of the oxalic acid so separates and is removed by filtration. The precipitated oxalic acid remaining on the filter may be washed and otherwise purified for utilization in usual manners, and a part of it may be used in the subsequent step of converting zinc tartrates into their corresponding acids. The filtrate obtained from the separation of the oxalic acid may be neutralized so that about 65% of the acid has been reacted. Such may be brought about by the addition of a neutralizing agent following determination of the amount of acid present, and this neutralizing agent may be in the form of zinc carbonate. In the event that a neutralizing agent other than zinc carbonate is used there follows an addition of a zinc compound, as zinc acetate, whereupon the tartaric acids and residual oxalic acid crystallize out in the form of their zinc salts. When zinc carbonate is used it is not necessary to add another zinc compound. Preferably also the crystallization is effected while the filtrate is in heated condition. After the solution cools, there is a crystalline precipitate formed of zinc dextro and meso tartrates and zinc oxalate which is filtered off and the corresponding tartaric acids released by treatment with oxalic acid. This treatment more particularly utilizes an amount of oxalic acid which should be as near as possible just sufficient to precipitate all of the zinc. After removal of the zinc oxalate the tartaric acids may then be further purified.

Example II

A procedure like that described in Example I using the quantities therein specified may be carried out and modified by adding a further quantity of concentrated nitric acid to the filtrate resulting from the separation of the zinc salts from the reaction mixture. This filtrate is believed to contain saccharic acid and like substances together with unreacted sugar and some incompletely reacted sugar, and the nitric acid added oxidizes these compounds to dextro and meso tartaric acids. Following the oxidation the reaction mixture may then have the oxalic acid separated therefrom, and this followed by precipitation, separation and conversion relative to the tartaric acids and in the manners described in Example I. If desired, the filtrates from two or more initial oxidations may be combined and concentrated prior to further oxidation through the addition of strong nitric acid. The results obtained are illustrated in the following tabulation. There is illustrated therein the carrying out of three initial oxidation steps from which the filtrates were combined for the second oxidation step or stage:

| 1st Acid oxidation | 2nd Acid oxidation | 1st oxidation | | | 2nd oxidation | | | Total, percent | | |
|---|---|---|---|---|---|---|---|---|---|---|
| | | $H_2T$ | $H_2M$ | $H_2O$ | $H_2T$ | $H_2M$ | $H_2O$ | $H_2T$ | $H_2M$ | $H_2O$ |
| 175 | 175 | 18.65<br>19.39<br>19.09 | 12.33<br>12.48<br>12.33 | 32.82<br>31.49<br>33.23 | 12.23 | 12.71 | 29.00 | 23.12 | 16.61 | 42.18 |
| 200 | 150 | 17.01<br>17.91<br>18.43 | 12.27<br>10.98<br>11.70 | 39.40<br>29.41<br>38.88 | 9.61 | 11.72 | 39.52 | 20.98 | 15.52 | 52.40 |
| 175 | 150 | 19.20<br>20.15<br>18.83 | 13.02<br>12.48<br>12.18 | 29.59<br>29.48<br>31.10 | 13.40 | 12.81 | 24.60 | 23.87 | 16.83 | 38.25 |
| 175 | 200 | 19.34<br>18.60<br>18.57 | 12.22<br>13.21<br>12.91 | 35.46<br>32.37<br>33.50 | 16.63 | 14.89 | 29.54 | 24.38 | 17.74 | 43.62 |

The total yields of tartaric acids in the above instances were respectively as follows:

39.73
36.50
40.70
42.12

Moreover, the inscriptions $H_2T$, $H_2M$ and $H_2O$ mean, respectively, dextro tartaric acid, meso tartaric acid, and oxalic acid.

Example III

A reaction mixture may be prepared as in Example I and to this mixture may be added .02 part of a catalyst containing vanadium, as sodium orthovanadate. The various steps are then carried out in the maner described in Example I.

While vanadium is mentioned above as a preferred catalyst, nevertheless other catalytic materials may be employed as a member of the group consisting of $Mn_2O_3$, $Fe_2O_3$, MnO, $Mo_2O_3$, Mn and Mo. It may be added that the latterly named substances are not as effectve as a vanadium catalyst, and that they serve to supplement its action when in admixture therewith.

Insoluble salts other than the zinc salts may be formed by the addition of a neutralizing salt of lead, barium, calcium or strontium, as the carbonates, hydroxides and basic carbonates; or, of a soluble salt, e. g. a chloride and nitrate to the oxidized solution following a partial neutralization with an antacid. The precipitation is effected, it will be realized, by utilization of a substance which reacts to form oxalates and tartrates which crystallize with ease from a solution containing a partially oxidized carbohydrate as saccharic acid, its lactone and aldehyde.

The foregoing procedures afford a means whereby carbohydrate containing material, especially dextrose or corn sugar, may be converted into dextro and meso tartaric acids with a resulting relatively high yield. There is presented thereby a more economic method for preparing tartaric acids inasmuch as the losses accompanying other procedures in which a portion of the tartaric acid first formed was lost through oxidation are to a considerable extent obviated. Moreover, the method provides a precipitating agent which occasions the separation of meso tartaric acid as well as dextro tartaric acid and residual oxalic acid. This precipitant may be a zinc compound which reacts forming zinc meso tartrate along with the other salts and since this compound is insoluble and crystallizes substantially immediately, it appears as a precipitate. Moreover, the zinc salts are characterized by a dense, granular structure which makes separation of the precipitate easy. The other salts do not possess this property, and although their use effects a precipitation, nevertheless the efficacy is not that of the zinc salts, and they cannot be looked upon as really equivalent. The obtainment of such a crystallized precipitate containing zinc dextro and meso tartrates and oxalate provides a ready mode for the separation of the tartaric acids and their subsequent release from the zinc salts by means, e. g. of an acid giving a less soluble zinc salt, for example, oxalic acid.

Since certain changes may be made in carrying out the above method without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A process for the production of tartaric acids which comprises oxidizing a carbohydrate in an aqueous solution with nitric acid in an initial amount insufficient to oxidize said carbohydrate fully to acids, with formation of dextro and mesotartaric acids and oxalic acid, separating oxalic acid from liquid, neutralizing about 60 to 70% of the acid present, precipitating dextro and mesotartaric acids and residual oxalic acid in the form of salts of a metal which reacts to form tartrates which crystallize with ease from a solution containing a partially oxidized carbohydrate, separating thus precipitated metal salts, converting the metal dextro and mesotartrates into the corresponding acids by reaction with an acid which forms a metal salt of greater insolubility than the tartrates, and further oxidizing liquid from the separation of the metal salts with subsequent separation of oxalic acid and precipitation, separation and conversion into dextro and mesotartaric acids in the foregoing manner.

2. A process for the production of tartaric acids which comprises oxidizing a carbohydrate in an aqueous solution with nitric acid with formation of dextro and meso tartaric acids and oxalic acid, separating oxalic acid from liquid, precipitating dextro and meso tartaric acids and residual oxalic acid in the form of zinc salts, separating thus precipitated zinc salts, and converting the zinc dextro and meso tartrates into the corresponding acids by reaction with an acid which forms a zinc salt of greater insolubility than the tartrates.

3. A process for the production of tartaric acids which comprises oxidizing a carbohydrate in an aqueous solution with nitric acid with formation of dextro and meso tartaric acids and oxalic acid, separating oxalic acid from liquid, precipitating dextro and meso tartaric acids and residual oxalic acid in the form of zinc salts, separating thus precipitated zinc salts, and converting the zinc dextro and meso tartrates into the corresponding acids by reaction with oxalic acid.

4. A process for the production of tartaric acids which comprises oxidizing a carbohydrate in an aqueous solution with nitric acid in the presence of a catalyst and while heated with the formation of dextro and meso tartaric acids and oxalic acid, separating oxalic acid from liquid, precipitating dextro and meso tartaric acids and residual oxalic acid in the form of zinc salts, separating thus precipitated zinc salts, and converting the zinc dextro and meso tartrates into the corresponding acids by reaction with oxalic acid.

5. A process for the production of tartaric acids which comprises oxidizing a carbohydrate in an aqueous solution with nitric acid with formation of dextro and meso tartaric acids and oxalic acid, separating oxalic acid from liquid, precipitating dextro and meso tartaric acids and residual oxalic acid through the addition of zinc carbonate to about 60%–70% neutralization and in heated condition, separating thus precipitated zinc salts, and converting the zinc dextro and meso tartrates into the corresponding acids by reaction with oxalic acid.

6. A process for the production of tartaric acids which comprises oxidizing dextrose in an aqueous solution with nitric acid in the presence of sodium orthovanadate as a catalyst and while heated with the formation of dextro and meso tartaric acids and oxalic acid, separating oxalic acid from liquid, precipitating dextro and meso tartaric acids and residual oxalic acid through the addition of zinc carbonate to about 65% neutralization and in heated condition, cooling, separating this precipitated zinc salt of dextro and meso tartaric acids and of oxalic acid, and converting zinc tartrates into the corresponding acids by reaction with oxalic acid.

7. A process for the production of tartaric acids which comprises oxidizing a carbohydrate in an aqueous solution with nitric acid with formation of dextro and meso tartaric acids and oxalic acid, separating oxalic acid from liquid, neutralizing about 60–70% of the acid present, precipitating dextro and meso tartaric acids and residual oxalic acid in the form of zinc salts, separating thus precipitated zinc salts, and converting the zinc dextro and meso tartrates into the corresponding acids by reaction with oxalic acid.

8. A process for the production of tartaric acids which comprises oxidizing a carbohydrate in an aqueous solution with nitric acid with formation of dextro and meso tartaric acids and oxalic acid, separating oxalic acid from liquid, precipitating dextro and meso tartaric acids and residual oxalic acid in the form of zinc salts, separating thus precipitated zinc salts by filtration, converting zinc tartrates into the corresponding acids by reaction with oxalic acid, and further oxidizing the filtrate from the separation of zinc salts with subsequent separation of oxalic acid, and precipitation, separation and conversion into dextro and meso tartaric acids in the foregoing manner.

9. In a process for the production of tartaric acids, the improvement which comprises separating dextro and meso tartaric acids from a solution by precipitation through crystallization thereof as zinc salts.

10. In a process for the production of tartaric acids, the improvement which comprises separating dextro and meso tartaric acids from a solution by precipitation through crystallization thereof as zinc salts, and converting the zinc salts into the corresponding acids by reaction with an acid which forms a zinc salt of greater insolubility.

WILLIAM E. STOKES.
WILLIAM E. BARCH.